UNITED STATES PATENT OFFICE.

CHRISTOFER G. LEONIS, OF ROCKY FORD, COLORADO.

PROCESS OF SEPARATING SODIUM AND POTASSIUM SALTS.

1,302,937.   Specification of Letters Patent.   Patented May 6, 1919.

No Drawing.   Application filed September 11, 1918.   Serial No. 253,571.

*To all whom it may concern:*

Be it known that I, CHRISTOFER G. LEONIS, a citizen of the United States, residing at Rocky Ford, in the county of Otero and State of Colorado, have invented certain new and useful Improvements in Processes of Separating Sodium and Potassium Salts, of which the following is a specification.

This invention relates to a process of completely separating any mixture of sodium salts and potassium salts and particularly effecting such separation in a mixture where such salts exist in the form of more or less complicated compounds.

The Bassett process of separating sodium and potassium salts, where the salts exist in the form of sulfates, is known but this process cannot be used satisfactorily in many cases, as for example, in the separation treatment of the salts of the char from the Steffen's waste water of beet sugar works which contains 60–70 per cent. of carbonates, 2–3 per cent. of sulfates and 16–20 per cent. of chlorids. Furthermore, so far as the applicant is advised, no satisfactory process of separating sodium and potassium salts, where such salts are in the form of hydroxids or mixtures of hydroxids and chlorids, is known.

In the practice of my process of separating sodium and potassium salts, I first eliminate all carbonates and sulfates by treating a solution of the salts to be separated with a solution of a hydroxid producing reagent comprising an alkaline earth metal such for example as calcium, strontium or barium oxid or hydroxid, these oxids and hydroxids being equivalents in my process. The details of practice of this operation, including the proportion of reagents, will vary with the composition of the salts to be separated but the particular details of procedure in carrying out this operation, in each instance, will be well understood by those skilled in the art.

The resulting solution contains the sodium and potassium salts in the form of hydroxids free from carbonates and sulfates. To this solution I add a chlorid producing reagent which may advantageously consist of hydrogen chlorid, sodium chlorid, or any other chlorid, preferably in the proportion sufficient to transform all of the potassium hydroxid present in the mixture to be separated into potassium chlorid. When sodium chlorid is used, the reaction is believed to be as follows:

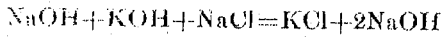

The potassium chlorid is then separated from the resulting mixture preferably by concentrating the solution until the potassium chlorid is precipitated. The sodium hydroxid after the removal of the precipitated potassium salt may then advantageously be concentrated.

It is to be understood that I have described the preferred practice of my process and that such process is not to be regarded as being limited to the details of procedure, except as set forth in the appended claims.

Having thus described my invention, I claim:—

1. The herein described process of separating sodium and potassium hydroxids which consists in treating a mixture of sodium and potassium hydroxids, free from carbonates and sulfates, with a chlorid producing reagent and separating potassium chlorid from the resulting solution.

2. The herein described process of separating sodium and potassium hydroxids which consists in treating a mixture of sodium and potassium hydroxids, free from carbonates and sulfates, with a chlorid and separating potassium chlorid from the resulting solution.

3. The herein described process of separating sodium and potassium hydroxids which consists in treating a mixture of sodium and potassium hydroxids, free from carbonates and sulfates, with sodium chlorid and separating potassium chlorid from the resulting solution.

4. The herein described process of separating sodium and potassium salts containing carbonates or sulfates which consists in treating a solution containing the mixture with a hydroxid producing reagent comprising an alkaline earth metal, adding a chlorid and separating potassium chlorid from the resulting mixture.

5. The herein described proces of separating sodium and potassium salts containing carbonates or sulfates which consists in treating a solution containing the mixture with an alkaline earth metal hydroxid, adding a metallic chlorid and separating potassium chlorid from the resulting mixture.

In testimony whereof I affix my signature in presence of two witnesses.

CHRISTOFER G. LEONIS.

Witnesses:
BELA RECKMEYER,
A. M. WHIPPLE.